US008774471B1

(12) United States Patent
Laaser et al.

(10) Patent No.: US 8,774,471 B1
(45) Date of Patent: Jul. 8, 2014

(54) TECHNIQUE FOR RECOGNIZING PERSONAL OBJECTS AND ACCESSING ASSOCIATED INFORMATION

(75) Inventors: William T. Laaser, Palo Alto, CA (US);
Gerald B. Huff, Berkeley, CA (US);
Arien C. T. Ferrell, Mountain View, CA (US); Michael J. Graves, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 161 days.

(21) Appl. No.: 12/969,885

(22) Filed: Dec. 16, 2010

(51) Int. Cl.
*G06K 9/00* (2006.01)

(52) U.S. Cl.
USPC ........... 382/115; 382/181; 382/190; 382/192; 382/138; 705/30; 705/27.2

(58) Field of Classification Search
USPC ........... 382/190, 192, 138, 139, 137; 705/30, 705/27.2, 26.64, 1.1, 4
See application file for complete search history.

(56) References Cited

U.S. PATENT DOCUMENTS

| | | | | |
|---|---|---|---|---|
| 7,558,408 B1 * | 7/2009 | Steinberg et al. | ............ | 382/118 |
| 7,917,286 B2 * | 3/2011 | Taylor et al. | .................. | 701/468 |
| 7,941,330 B1 * | 5/2011 | Buentello et al. | ................ | 705/4 |
| 7,978,219 B1 * | 7/2011 | Imes | .......................... | 348/207.1 |
| 8,131,118 B1 * | 3/2012 | Jing et al. | ...................... | 382/305 |
| 2002/0032626 A1 * | 3/2002 | DeWolf et al. | ................. | 705/35 |
| 2005/0169496 A1 * | 8/2005 | Perry | .......................... | 382/100 |
| 2006/0114531 A1 * | 6/2006 | Webb et al. | ...................... | 359/15 |
| 2008/0089561 A1 * | 4/2008 | Zhang | .......................... | 382/118 |
| 2008/0267504 A1 * | 10/2008 | Schloter et al. | ............... | 382/181 |
| 2008/0268876 A1 * | 10/2008 | Gelfand et al. | ............... | 455/457 |
| 2008/0285855 A1 * | 11/2008 | Shiiyama et al. | ............. | 382/190 |
| 2008/0301153 A1 * | 12/2008 | Greer et al. | ..................... | 707/10 |
| 2009/0005078 A1 * | 1/2009 | Dariel | ........................ | 455/456.2 |
| 2009/0070273 A1 * | 3/2009 | Moryto | ............................ | 705/80 |
| 2009/0102859 A1 * | 4/2009 | Athsani et al. | ................ | 345/619 |
| 2009/0138290 A1 * | 5/2009 | Holden | ............................ | 705/4 |
| 2009/0204511 A1 * | 8/2009 | Tsang | ............................ | 705/27 |
| 2009/0265193 A1 * | 10/2009 | Collins et al. | ..................... | 705/4 |
| 2009/0276761 A1 * | 11/2009 | Saeed | ........................... | 717/127 |
| 2010/0042459 A1 * | 2/2010 | Horton | ............................ | 705/8 |
| 2010/0088507 A1 * | 4/2010 | Cho | ............................. | 713/156 |
| 2010/0150397 A1 * | 6/2010 | Handley et al. | ............... | 382/100 |
| 2010/0198700 A1 * | 8/2010 | Ramaswamy | ................. | 705/27 |
| 2011/0161116 A1 * | 6/2011 | Peak et al. | ........................ | 705/4 |
| 2011/0161117 A1 * | 6/2011 | Busque et al. | .................... | 705/4 |
| 2011/0161232 A1 * | 6/2011 | Brown | ........................... | 705/71 |
| 2011/0246495 A1 * | 10/2011 | Mallinson | ..................... | 707/758 |
| 2012/0095819 A1 * | 4/2012 | Li | ............................. | 705/14.23 |
| 2012/0219175 A1 * | 8/2012 | Richardson et al. | .......... | 382/103 |
| 2012/0265633 A1 * | 10/2012 | Wohlstadter et al. | ........ | 705/26.3 |

* cited by examiner

*Primary Examiner* — Stephen R Koziol
*Assistant Examiner* — Shaghayegh Azima
(74) *Attorney, Agent, or Firm* — Park, Vaughan, Fleming & Dowler LLP; Steven E. Stupp (57) ABSTRACT

The disclosed embodiments relate to a system that recognizes a personal object in an image and facilitates providing a related financial service. During operation, the system receives an image of an object associated with a user, where the image includes environmental features associated with the user. Next, the system extracts content from the image by processing the image (and the included environmental features) using an image-processing technique. The system then associates the extracted content with information in a pre-existing data structure, where the pre-existing data structure includes financial information associated with the object. Next, the system facilitates a financial service associated with the object based on the information. For example, the system may generate an insurance appraisal for the object based on the information.

22 Claims, 7 Drawing Sheets

TECHNIQUE FOR RECOGNIZING PERSONAL OBJECTS AND ACCESSING ASSOCIATED INFORMATION

BACKGROUND

The present disclosure relates to a technique for recognizing a personal or proprietary object in an image and accessing associated information to facilitate a related financial service.

Image-processing techniques are presently being used to identify objects in images (such as photographs). In particular, image-processing techniques can be used to extract object-related content from an image, and then an image-based search can be performed to identify the object. Typically, this involves comparing the extracted content against a data structure or a database containing content associated with public objects. For example, using this approach, the Eiffel tower may be identified in a photograph of the Paris skyline.

However, this approach is typically restricted to "public" objects. This limits the applicability of such techniques, because individuals often take pictures of personal objects and it would be useful for the individuals to obtain information associated with these personal objects. Similarly, businesses often possess images associated with proprietary products and it would be useful for the businesses to obtain information associated with the proprietary products. Note that information associated with these personal or proprietary objects are typically not included in the data structures or databases that are used to perform image-based searches.

As a consequence, individuals and businesses are often unable to conduct image-based searches for personal or proprietary objects. In addition to being a source of frustration, this problem can restrict the range of services that can be provided to individuals and business based on objects identified in their images.

SUMMARY

The disclosed embodiments relate to a computer system that recognizes a personal object in an image and facilitates providing a related financial service. During operation, the computer system receives an image of an object associated with a user, where the image includes environmental features associated with the user. Next, the computer system extracts content from the image by processing the image (and the included environmental features) using an image-processing technique. The computer system then associates the extracted content with information in a pre-existing data structure, where the pre-existing data structure includes financial information associated with the object. Next, the computer system facilitates a financial service associated with the object based on the information. For example, the computer system may generate an insurance appraisal for the object based on the information.

In some embodiments, the computer system also receives location information associated with the object, and the information is associated with the extracted content based on the received location information.

Note that the information may include: a purchase price of the object, a current valuation of the object, and/or a merchant that provided the object. Furthermore, the pre-existing data structure may be associated with financial software.

In some embodiments, the computer system receives another image of the object, and the computer system processes the other image using the image-processing technique to extract additional content from the other image. Furthermore, the computer system may associate the additional extracted content with additional information or the same information in the pre-existing data structure. Additionally, the computer system may provide the financial service based on the information and the additional information. Note that the content and/or the additional content may include: a color histogram, detected feature edges in the image or the other image and/or features in the image or the other image.

Another embodiment relates to the computer system that receives the image of the object associated with the user, where the image includes the environmental features associated with the user. Then, the computer system extracts the content from the image by processing the image and the environmental features using the image-processing technique. The computer system also receives another image of the object, and the computer system processes the other image using the image-processing technique to extract additional content from the other image. Next, the computer system associates the content and/or the additional extracted content with information in a pre-existing data structure, where the pre-existing data structure includes information associated with the object, such as the identity of the object and/or where it is located (e.g., the environment of the user).

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for recognizing a personal object in an image and facilitating providing a related financial service, and a computer-program product (e.g., software) for use with the computer system are described. During operation, the system receives an image of an object associated with a user, where the image includes environmental features associated with the user. Next, the system extracts content from the image by processing the image (and the included environmental features) using an image-processing technique. The system then associates the extracted content with information in a pre-existing data structure, where the pre-existing data structure includes financial information associated with the object. Next, the system facilitates a financial service associated with the object based on the information. For example, the system may generate an insurance appraisal for the object based on the information.

By determining the association using 'private' information (such as that known to the user), as opposed to 'public' information (which, in principle, is known or is accessible by a large number of individuals), this recognition technique can facilitate personalized services, such as generating the insurance appraisal for objects in the user's home or business, and, more generally, the providing of the financial service. In this way, the recognition technique can facilitate: improved customer service and an enhanced user experience, with a commensurate impact on customer loyalty, and the profitability and market share of the provider of the recognition technique.

In the discussion that follows, the user may include one of a variety of entities, such as: an individual (for example, an existing customer, a new customer, a service provider, an income-tax professional, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
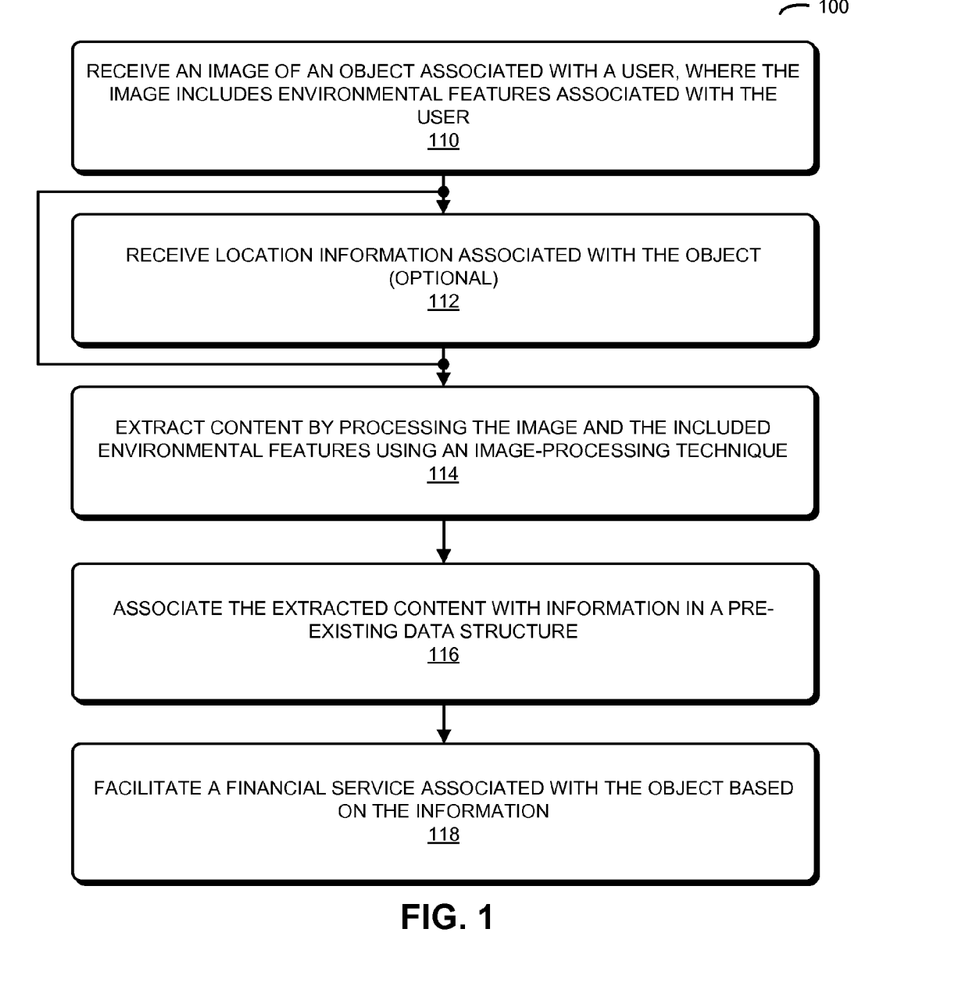
FIG. 1 is a flow chart illustrating a method for providing a financial service in accordance with an embodiment of the present disclosure.

We now describe embodiments of the recognition technique. FIG. 1 presents a flow chart illustrating a method 100 for providing a financial service, which may be performed by a computer system (such as computer systems 500 in FIG. 5 and/or 600 in FIG. 6). During operation, the computer system receives an image of an object associated with a user (operation 110). This image may include environmental features associated with the user (such as aspects of the user's home or residence, automobile, business, etc.). For example, the environmental features may include characteristics of a room, such as its color or shape, the terrain or flora surrounding a home, etc.

Then, the computer system extracts content from the image by processing the image and the environmental features using an image-processing technique (operation 114). Note that the content may include: a color histogram, detected feature edges in the image (such as the outline of the object) and/or features in the image.

Moreover, the computer system associates the extracted content with information in a pre-existing data structure (operation 116), where the pre-existing data structure includes financial information associated with the object. For example, the information may include: a purchase price of the object, a current valuation of the object, and/or a merchant that provided the object. Furthermore, the pre-existing data structure may be associated with financial software (such as financial accounting software, income-tax software, etc.).

In some embodiments, the computer system optionally receives location information associated with the object (operation 112), and the information is also associated with the extracted content based on the received location information. For example, the image may be acquired by the user using a camera or a cellular telephone, and information specifying the location of this portable electronic device (such as the Global Positioning System location) may be provided along with the image.

Next, the computer system facilitates a financial service associated with the object based on the information (operation 118). For example, the computer system may generate an insurance appraisal for the object based on the information. In particular, the combination of the identified object (such as a belonging in the user's home) with the financial information may allow the current valuation or the replacement value of the object to be determined. Then, using an actuarial table, a coverage amount and/or selected insurance-coverage conditions (such as a deductible), an appropriate increment to the user's insurance bill can be calculated. In this way, the current value of one or more objects in the user's environment may be determined, and an insurance quote can be calculated.

In some embodiments, the computer system optionally receives another image of the object, and the computer system optionally processes the other image using the image-processing technique to extract additional content from the other image. Furthermore, the computer system may optionally associate the additional extracted content with additional information or the same information in the pre-existing data structure. Additionally, the computer system may optionally provide the financial service, which is associated with the object, based on the information and the additional information. Note that the additional content may include: a color histogram, detected feature edges in the other image and/or features in the other image. In this way, multiple images of the object and/or the associated environmental features may be used to associate extracted content with information in the pre-existing data structure.

Figure 2:
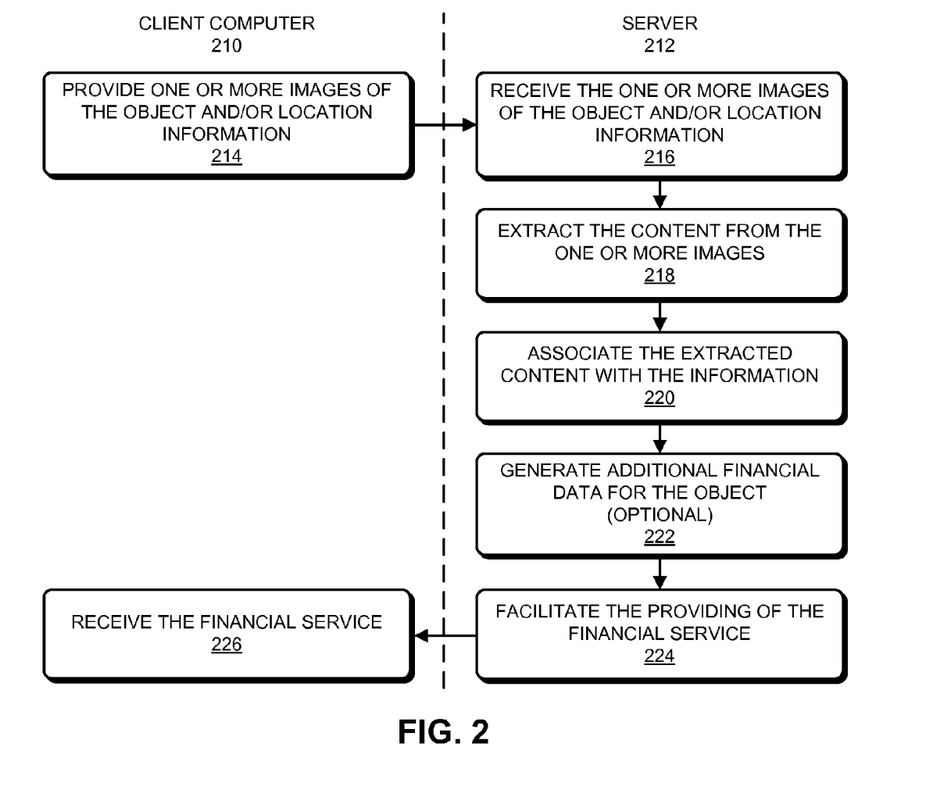
FIG. 2 is a flow chart illustrating the method of FIG. 1 in accordance with an embodiment of the present disclosure.

In an exemplary embodiment, the technique for providing the financial service is implemented using one or more client computers (or portable electronic devices) and at least one server computer, which communicate through a network, such as the Internet (i.e., using a client-server architecture). This is illustrated in FIG. 2, which presents a flow chart illustrating method 100. During this method, a user of a client computer 210 provides one or more images of the object, including one or more environmental features associated with the user, and/or location information associated with the object (operation 214).

After receiving the one or more images and/or the location information (operation 216), server 212 extracts the content from the one or more images by processing the image and the environmental features using an image-processing technique (operation 218).

Then, server 212 associates the extracted content and/or the location information with information in a pre-existing data structure (operation 220). In some embodiments, the pre-existing data structure includes financial information associated with the object. (However, as noted below, in other embodiments the pre-existing data structure includes information other than or in addition to the financial information associated with the object.)

Next, server 212 facilitates the providing of the financial service, which is associated with the object, based on the information (operation 224). This facilitated financial service may be received by (operation 226) client computer 210. For example, providing the financial service may optionally involve generating additional financial data for the object (operation 222), such as an insurance appraisal for the object based on the information.

Figure 3:
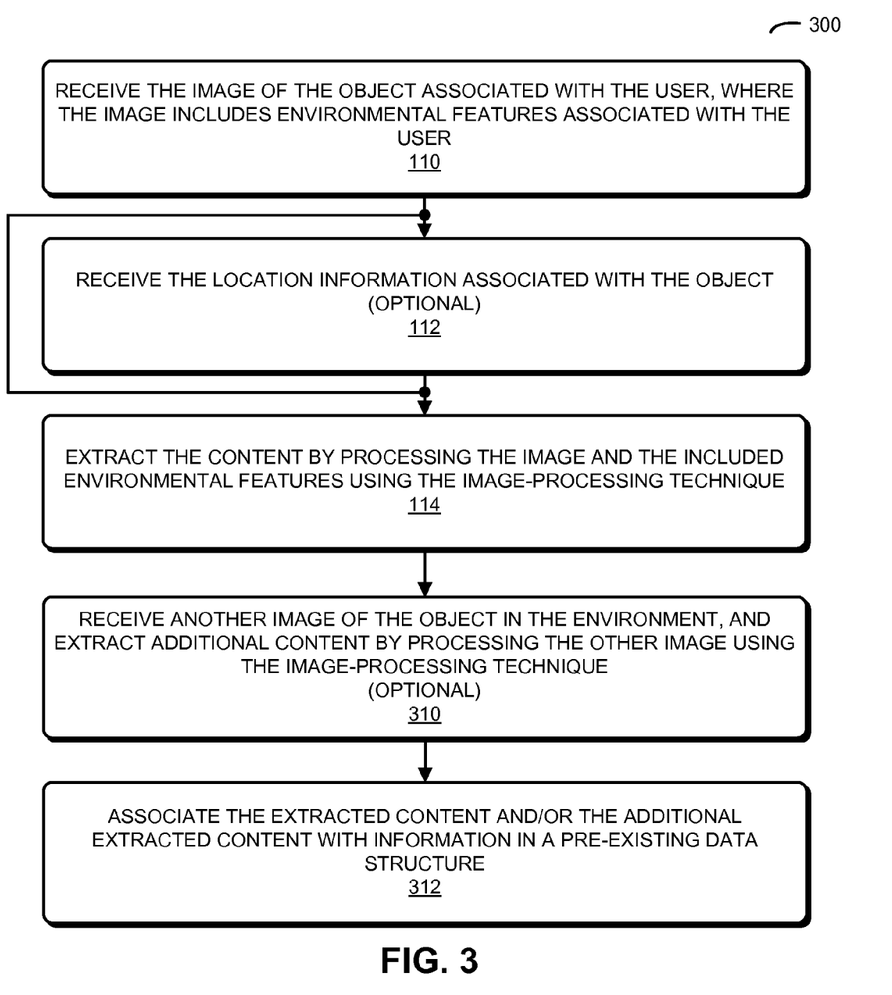
FIG. 3 is a flow chart illustrating a method for associating content in images with an object associated with a user in accordance with an embodiment of the present disclosure.

More generally, this recognition technique may be applied to applications other than those which provide the financial service. This is shown in FIG. 3, which presents a flow chart illustrating a method 300 for associating content in images that include an object associated with a user, which may be performed by a computer system (such as computer systems

Figure 5:
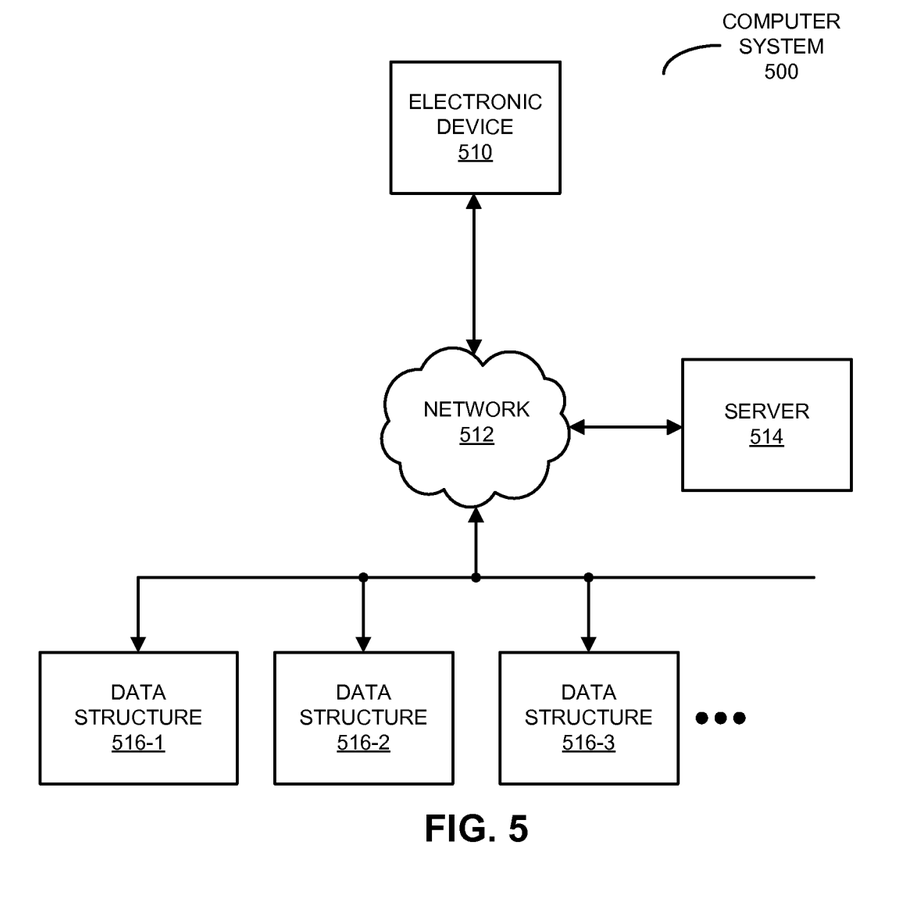
FIG. 5 is a block diagram illustrating a computer system that performs the methods of FIGS. 1-3 in accordance with an embodiment of the present disclosure.
Figure 6:
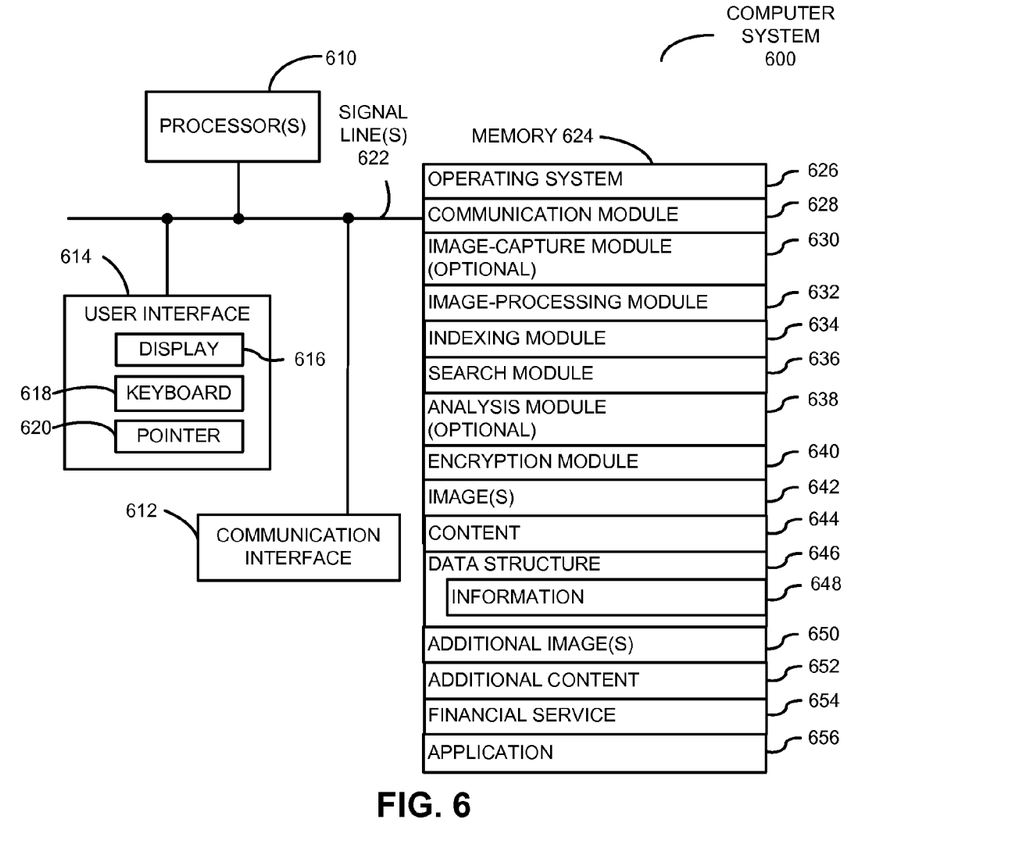
FIG. 6 is a block diagram illustrating a computer system that performs the methods of FIGS. 1-3 in accordance with an embodiment of the present disclosure.

500 in FIG. 5 and/or 600 in FIG. 6). During operation, the computer system receives the image of the object associated with the user (operation 110), where the image includes environmental features associated with the user. Then, the computer system extracts content from the image by processing the image and the environmental features using the image-processing technique (operation 114).

Moreover, the computer system optionally receives another image of the object (operation 310), and the computer system optionally processes the other image using the image-processing technique to extract additional content from the other image (operation 310).

Next, the computer system may associate the content and/or the additional extracted content with information in the pre-existing data structure (operation 312), where the pre-existing data structure includes information associated with the object. Alternatively or additionally, the computer system may associate the image with the closest matching image in the pre-existing data structure (such as the image with highest match score), thereby also making the association with the information in the pre-existing data structure.

Note that the information may specify the identity of the object and/or where it is located (e.g., the environment of the user). In some embodiments, this approach may allow small businesses to provide customers with information about their products. Thus, the pre-existing data structure may be maintained by a small business, and the information may include: products related to the object, product availability, a manufacturer's website, support information, inventory information, sales velocity of one or more products, etc. More generally, the information may include metadata about a product. Furthermore, this information may be made available to the user while the user is present at the small-business establishment (e.g., while the user is in a store). For example, the information may be displayed on a portable electronic device (such as a cellular telephone) that the user used to capture and provide the image and/or the other image of the object.

In some embodiments, the computer system optionally receives location information associated with the object (operation 112), and the information is associated with the extracted content and/or the additional extracted content based on the received location information.

Thus, by using multiple images and, in particular, the content extracted from the multiple images, this embodiment of the recognition technique may more readily facilitate associations with the information in the pre-existing data structure, which, in turn, may facilitate a wide variety of products and services (such as generating the insurance appraisal or, more generally, providing the financial service).

In some embodiments of methods 100 (FIGS. 1 and 2) and 300 there may be additional or fewer operations. Moreover, the order of the operations may be changed, and/or two or more operations may be combined into a single operation.

In an exemplary embodiment, the recognition technique is used to: recognize personal objects or objects associated with a business, and provide information about those objects. In particular, image-processing technology may be used to extract content from one or more images (such as images of personal property or products in a store), and the identified information may include: purchase prices, memories, etc.

For example, an individual or a small business may construct a data structure of images (or image models). In particular, images may be pre-processed (for example, using an indexing technique) so that they can be subsequently easily identified or found in the data structure. Note that this data structure may include various characteristics or content in the images, such as: a color histogram, a spatial frequency histogram, detected feature edges, feature identification, image-processing parameters, etc. In addition, the data structure may include information (such as metadata) associated with the images.

Subsequently, when a user captures and submits an image of an object and/or environmental features in a surrounding environment that are associated with the user, the image and/or content extracted from the image may be used to make an association with the information in the pre-existing data structure. For example, the content may be compared to the content in the pre-existing data structure using search techniques. For example, an image-based search expression may be generated from the image. This image-based search expression may include permutations on the object (such as illumination, orientation, etc. and, more generally, content extracted from the image). Then, the image-based search expression may be compared to the pre-existing data structure, and match scores may be generated based on the agreement between the content in the pre-existing data structure and the image-based search expression. The information associated with the image may be the information for the entry in the pre-existing data structure that has the closest match (i.e., the highest match score). Thus, this 'look up' or identification operation may depend on the characteristics or content extracted from the image, such as: a color histogram, clusters of edges, features, etc. Note that this recognition technique may be performed in real time or near real time.

As noted previously, in some embodiments the recognition technique may be used for insurance purposes (and, more generally, to provide financial services). For example, a user may provide an image of an object and its surrounding environment. Extracted content from the image may be associated with information in pre-existing data structures, such as financial software that is routinely used by the user for accounting or income-tax purposes. Then, the associated information may be used to generate an insurance appraisal for valuation of one or more objects in the user's environment (such as their home) and/or to determine a rate quote for insurance based on the insurance appraisal.

Figure 4:
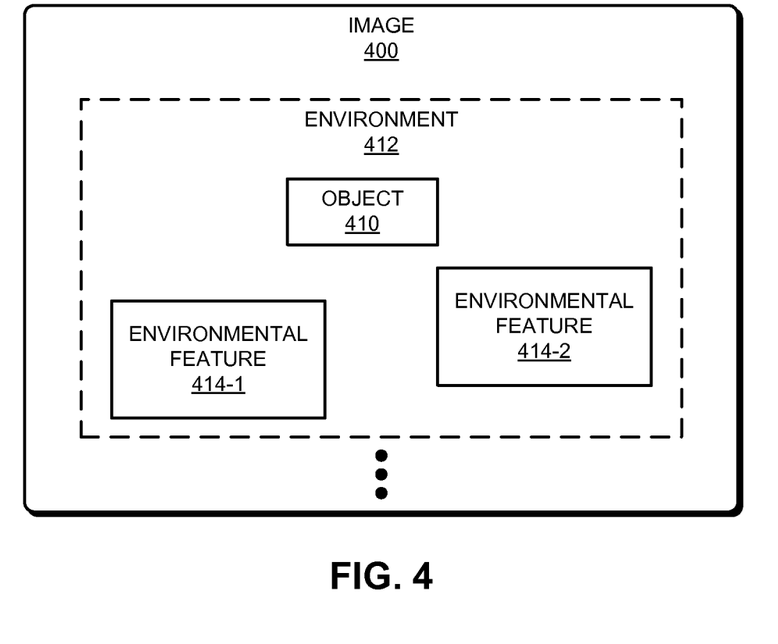
FIG. 4 is a block diagram illustrating an image of an object associated with a user in accordance with an embodiment of the present disclosure.

We now describe embodiments of an image. FIG. 4 presents a block diagram illustrating an image 400. This image includes an object 410, which is associated with a user, in an environment 412. Furthermore, environment 412 may include environmental features 414 that are associated with the user, and which can be used to identify object 410 and/or environment 412. For example, as noted previously, an image-processing technique may be used to extract characteristics or content in image 400, and this extracted content may be used to associate image 400 with information in a pre-existing data structure.

We now describe embodiments of the computer system. FIG. 5 presents a block diagram illustrating a computer system 500 that performs methods 100 (FIGS. 1 and 2) and/or 300 (FIG. 3). In this system, a user of electronic device 510 (for example, a computer or a portable electronic device, such as a cellular telephone and/or a digital camera) may use a software product that provides one or more images of one or more objects (as well as their associated environments and/or environmental features) to server 514 via network 512. Note that these images may have been acquired using the cellular telephone and/or the digital camera. In some embodiments, electronic device 510 provides location information, such as a location of electronic device 510 where the one or more images were acquired.

For example, the user may interact with a web page that is provided by server 514 via network 512, and which is rendered by a web browser on electronic device 510. Alternatively, the user may use a software application that is resident on and that executes on electronic device 510. This software application may be a stand-alone application or a portion of another application that is resident on and which executes on electronic device 510 (such as software that is provided by server 514 or that is installed and which executes on electronic device 510).

In some embodiments, at least a portion of the software application may be an application tool (such as a software application tool) that is embedded in the web page (and which executes in a virtual environment of the web browser). Thus, the software application tool may be provided to the user via a client-server architecture.

As discussed previously, after receiving the one or more images, server 514 may extract content from the one or more images by processing the image and the environmental features using an image-processing technique. Furthermore, server 514 may associate the extracted content and/or the location information with the information in one or more pre-existing data structures 516 by accessing the one or more pre-existing data structures 516 via network 512. For example, the image-processing technique may use the environmental features to identify the environment (such as the user's home or a business). In conjunction with additional extracted content (such as feature edges), this may be used to identify the object. Note that the pre-existing data structures may include financial information associated with the object and, more generally, information (such as product information) associated with the object.

In some embodiments, server 514 uses the information from pre-existing data structures 516 to generate the insurance appraisal for the object. More generally, server 514 may provide a financial service (such as a rate quote, an income-tax deduction, etc.) associated with the object based on the information from pre-existing data structures 516. After generating the insurance appraisal, server 514 may provide it to electronic device 510 via network 512.

Furthermore, in some embodiments the user subsequently provides another image(s) to server 514 from electronic device 510 via network 512. These other image(s) may be similarly processed, and the extracted content from these other images may facilitate the association with the information or additional information in one or more of pre-existing data structures 516. In particular, based on the association defined for the initial image(s), it may be possible to make an immediate association or 'link' to the information when the one or more other image(s) are received and processed.

Note that the one or more images, the information, and/or the financial service (such as the insurance appraisal) in computer system 500 may be stored at one or more locations in computer system 500 (i.e., locally or remotely). Moreover, because this data may be sensitive in nature, it may be encrypted. For example, stored data and/or data communicated via network 512 may be encrypted.

FIG. 6 presents a block diagram illustrating a computer system 600 that performs methods 100 (FIGS. 1 and 2) and/or 300 (FIG. 3), such as server 514 (FIG. 5). Computer system 600 includes one or more processing units or processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: optional image-capture module 630 (or a set of instructions), image-processing module 632 (or a set of instructions), indexing module 634 (or a set of instructions), search module 636 (or a set of instructions), optional analysis module 638 (or a set of instructions), encryption module 640 (or a set of instructions) and/or application 656 (or a set of instructions). Note that one or more of these program modules (or sets of instructions) may constitute a computer-program mechanism.

During operation of computer system 600, optional image-capture module 630 may capture one or more images 642 (or image models). Alternatively or additionally, the one or more images 642 may be received from another electronic device via communication interface 612 and communication module 628.

Then, image-processing module 632 may extract content 644 from the one or more images 642, such as content 644 associated with an object(s) and/or environmental feature(s) in the one or more images 642.

Figure 7:
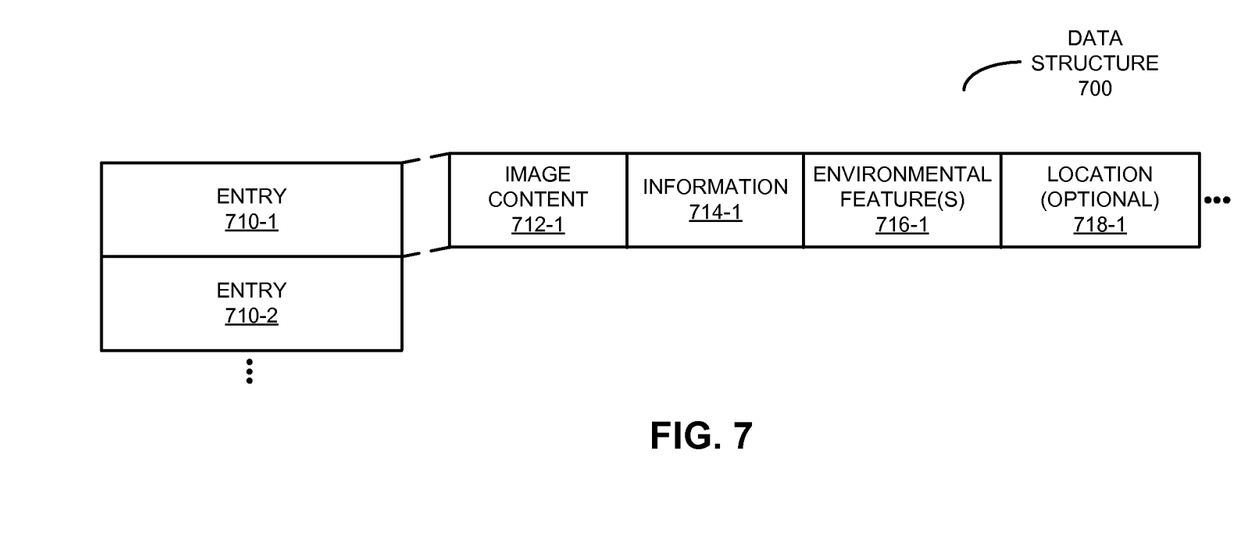
FIG. 7 is a block diagram illustrating a data structure for use in the computer system of FIG. 5 in accordance with an embodiment of the present disclosure.

Moreover, indexing module 634 may arrange the one or more images 642 and/or the extracted content 644 in a data structure 646. An embodiment of the data structure is shown FIG. 7, which presents a block diagram illustrating a data structure 700 for use in computer system 600 (FIG. 6). In particular, data structure 700 may include entries 710. For example, entry 710-1 may include: image content 712-1, associated information 714-1, environmental feature(s) 716-1 and/or an optional location 718-1.

Referring back to FIG. 6, data structure 646 may facilitate rapid identification of information 648 in data structure 646 based on extracted content from other images. In particular, optional image-capture module 630 may capture one or more additional images 650 (or image models). Alternatively or additionally, the one or more additional images 650 may be received from another electronic device via communication interface 612 and communication module 628. Then, image-processing module 632 may extract additional content 652 from the one or more additional images 650, such as additional content 652 associated with an object(s) and/or environmental feature(s) in the one or more additional images 650. Moreover, search module 636 may use the extracted additional content 652 to identify or 'look up' information 648 in data structure 646.

In some embodiments, optional analysis module 638 may facilitate the providing of a financial service 654 associated with the object(s) based on information 648. For example, optional analysis module 638 may generate an insurance appraisal and/or a rate quote based on information 648.

Furthermore, because data structure 646 and/or information 648 may be sensitive in nature, in some embodiments at least some of the data stored in memory 624 and/or at least some of the data communicated using communication module 628 is encrypted using encryption module 640.

Instructions in the various modules in memory 624 may be implemented in: a high-level procedural language, an object-oriented programming language, and/or in an assembly or machine language. Note that the programming language may be compiled or interpreted, e.g., configurable or configured, to be executed by the one or more processors 610.

Although computer system 600 is illustrated as having a number of discrete items, FIG. 6 is intended to be a functional description of the various features that may be present in computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. In some embodiments, some or all of the functionality of computer system 600 may be implemented in one or more application-specific integrated circuits (ASICs) and/or one or more digital signal processors (DSPs).

Computers and servers in computer systems 500 (FIG. 5) and/or 600 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 512 (FIG. 5) may include: the Internet, World Wide Web (WWW), an intranet, LAN, WAN, MAN, or a combination of networks, or other technology enabling communication between computing systems.

In exemplary embodiments, data structure 646 is associated with application 656. For example, application 656 may include a financial-software application (e.g., financial software), such as: Quicken™ and/or TurboTax™ (from Intuit, Inc., of Mountain View, Calif.), Microsoft Money™ (from Microsoft Corporation, of Redmond, Wash.), Splash-Money™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Image 400 (FIG. 4), computer system 500 (FIG. 5), computer system 600 (FIG. 6) and/or data structure 700 may include fewer components or additional components. Moreover, two or more components may be combined into a single component, and/or a position of one or more components may be changed. In some embodiments, the functionality of computer system 500 (FIG. 5) and/or computer system 600 may be implemented more in hardware and less in software, or less in hardware and more in software, as is known in the art.

While the preceding discussion illustrated the use of the recognition technique to provide a financial service and, more generally, to associate image(s) with information in data structures, this technique may be used in a wide variety of applications. Furthermore, while the preceding embodiments illustrated the use of a pre-existing data structure by an individual or a business, more generally there may be multiple data structures that are associated with different entities or applications. These data structures may share content and/or information. In this way, a customer of a small business may, directly or indirectly, access a data structure maintained and provided by a manufacturer or a provider of a product that is sold by the small business based on an image (such as a digital photograph) of this product. Additionally, while the preceding embodiments illustrate the use of the recognition technique by the individual or a business, in other embodiments the recognition technique is provided as a service by a third party to multiple individuals and/or entities (such as businesses or organizations).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for recognizing a personal object in an image and facilitating providing a related financial service, comprising:

receiving a pre-existing data structure that comprises information for a set of objects, wherein the information comprises, for each object in the set, object information describing the object and financial information for the object that comprises information from a database used by accounting or income-tax software;

after receiving the data structure, receiving an image of an object associated with a user, wherein the image includes environmental features that comprise aspects of a surrounding environment where the image was captured;

extracting content from the image by processing the image and the environmental features using an image-processing technique;

determining whether or not the extracted content indicates that the surrounding environment is associated with the user;

in response to determining that the surrounding environment is associated with the user, associating, using a computer, the extracted content with the information in the data structure, wherein associating the extracted content with the information in the data structure comprises using the object information to match the object with an object in the set of objects; and facilitating the financial service based on the information, wherein the financial service is associated with the object, and wherein facilitating the financial service comprises using at least some of the information from the database.

2. The method of claim 1, wherein the method further comprises receiving location information associated with the object; and wherein the information is associated with the extracted content based on the received location information.

3. The method of claim 1, wherein the information includes at least one of: a purchase price of the object, a current valuation of the object, and a merchant that provided the object.

4. The method of claim 1, wherein the method further comprises:

receiving another image of the object; and processing the other image using the image-processing technique to extract additional content from the other image.

5. The method of claim 4, wherein the method further comprises associating the additional extracted content with additional information in the pre-existing data structure.

6. The method of claim 5, wherein the method further comprises providing the financial service based on the information and the additional information.

7. The method of claim 4, wherein the additional content includes at least one of: a color histogram, detected feature edges in the other image and features in the other image.

8. The method of claim 1, wherein the method further comprises:

receiving another image of the object;

processing the other image using the image-processing technique to extract additional content from the other image; and associating the other image and the image based on the extracted content and the additional extracted content.

9. The method of claim 1, wherein the content includes at least one of: a color histogram, detected feature edges in the image and features in the image.

10. The method of claim 1, wherein the financial service includes an insurance appraisal for the object that is generated based on the information.

11. A computer-program product for use in conjunction with a computer system, the computer-program product comprising a non-transitory computer-readable storage medium storing instructions that when executed by a computer cause the computer to perform a method for recognizing a personal object in an image and for facilitating providing a related financial service, the method comprising:

receiving a pre-existing data structure that comprises information for a set of objects, wherein the information comprises, for each object in the set, object information describing the object and financial information for the object that comprises information from a database used by accounting or income-tax software;

after receiving the data structure, receiving an image of an object associated with a user, wherein the image includes environmental features that comprise aspects of a surrounding environment where the image was captured;

extracting content from the image by processing the image and the environmental features using an image-processing technique;

determining whether or not the extracted content indicates that the surrounding environment is associated with the user;

in response to determining that the surrounding environment is associated with the user, associating the extracted content with and the information in the data structure, wherein associating the extracted content with the information in the data structure comprises using the object information to match the object with an object in the set of objects; and facilitating the financial service based on the information, wherein the financial service is associated with the object, and wherein facilitating the financial service comprises using at least some of the information from the database.

12. The computer-program product of claim 11, wherein the computer-program mechanism further includes instructions for receiving location information associated with the object; and wherein the information is associated with the extracted content based on the received location information.

13. The computer-program product of claim 11, wherein the information includes at least one of: a purchase price of the object, a current valuation of the object, and a merchant that provided the object.

14. The computer-program product of claim 11, wherein the computer-program mechanism further includes:

instructions for receiving another image of the object; and instructions for processing the other image using the image-processing technique to extract additional content from the other image.

15. The computer-program product of claim 14, wherein the computer-program mechanism further includes instructions for associating the additional extracted content with additional information in the pre-existing data structure.

16. The computer-program product of claim 15, wherein the computer-program mechanism further includes instructions for providing the financial service based on the information and the additional information.

17. The computer-program product of claim 14, wherein the additional content includes at least one of: a color histogram, detected feature edges in the other image and features in the other image.

18. The computer-program product of claim 11, wherein the computer-program mechanism further includes:

instructions for receiving another image of the object;

instructions for processing the other image using the image-processing technique to extract additional content from the other image; and instructions for associating the other image and the image based on the extracted content and the additional extracted content.

19. The computer-program product of claim 11, wherein the content includes at least one of: a color histogram, detected feature edges in the image and features in the image.

20. A computer system, comprising:

a processor;

memory; and a program module, wherein the program module is stored in the memory and configurable to be executed by the processor to recognize a personal object in an image and facilitate providing a related financial service, the program module including:

instructions for receiving a pre-existing data structure that comprises information for a set of objects, wherein the information comprises, for each object in the set, object information describing the object and financial information for the object that comprises information from a database used by accounting or income-tax software;

instructions for, after receiving the data structure, receiving an image of an object associated with a user, wherein the image includes environmental features that comprise aspects of a surrounding environment where the image was captured;

instructions for extracting content from the image by processing the image and the environmental features using an image-processing technique;

instructions for determining whether or not the extracted content indicates that the surrounding environment is associated with the user;

instructions for associating the extracted content with and the information in the data structure in response to determining that the surrounding environment is associated with the user, wherein associating the extracted content with the information in the data structure comprises using the object information to match the object with an object in the set of objects; and instructions for facilitating the financial service based on the information, wherein the financial service is associated with the object, and wherein facilitating the financial service comprises using at least some of the information from the database.

21. The method of claim 1, wherein the financial service comprises an insurance appraisal for the object in the image, and wherein facilitating the insurance appraisal comprises determining a value for the object by using the financial information in the data structure for the object in the set of objects that matches the object in the image.

22. The method of claim 1, wherein the database used by the accounting or income-tax software comprises a database for a business establishment where the user is shopping, wherein receiving the image of the object comprising receiving the image from the user at a computer for the business establishment, and wherein facilitating the financial service comprises providing information from the database to the user.

* * * * *